(12) United States Patent
Ro

(10) Patent No.: US 8,555,916 B2
(45) Date of Patent: Oct. 15, 2013

(54) SOLENOID VALVE HAVING FLOW CONTROL FUNCTION

(75) Inventor: Gwan Ho Ro, Seoul (KR)

(73) Assignee: Useong Electro Mechanics Co., Ltd., Anyang, Gyeonggi-Do (KR)

( * ) Notice: Subject to any disclaimer, the term of this patent is extended or adjusted under 35 U.S.C. 154(b) by 144 days.

(21) Appl. No.: 13/373,391

(22) Filed: Nov. 14, 2011

(65) Prior Publication Data

US 2013/0075634 A1    Mar. 28, 2013

(30) Foreign Application Priority Data

Sep. 27, 2011 (KR) .......................... 10-2011-0097285

(51) Int. Cl.
*F16K 31/12* (2006.01)

(52) U.S. Cl.
USPC ................. 137/497; 137/614.2; 251/30.03; 138/46

(58) Field of Classification Search
USPC ............... 137/613, 628, 629, 630, 630.13, 137/630.14, 630.16, 614.16, 614.18, 497, 137/614.2, 504, 498, 517; 251/30.03; 138/46
See application file for complete search history.

(56) References Cited

U.S. PATENT DOCUMENTS

| | | | | |
|---|---|---|---|---|
| 2,647,692 A * | 8/1953 | Keller et al. | ................... | 137/630 |
| 2,851,060 A * | 9/1958 | Fleischer et al. | ................. | 138/46 |
| 2,936,790 A * | 5/1960 | Erickson et al. | ................. | 138/46 |
| 2,944,565 A * | 7/1960 | Dahl | ........................... | 251/30.03 |
| 2,948,296 A * | 8/1960 | Thorburn | ......................... | 138/46 |
| 3,557,837 A * | 1/1971 | Giwosky | ................... | 137/630.14 |
| 4,248,270 A * | 2/1981 | Ostrowski | ........................ | 138/46 |
| 5,145,145 A * | 9/1992 | Pick et al. | ................... | 251/30.03 |
| 5,363,873 A * | 11/1994 | Richmond | ................. | 251/30.03 |
| 5,487,528 A * | 1/1996 | Richmond | ................. | 251/30.03 |
| 5,582,205 A * | 12/1996 | McCarty et al. | .............. | 137/545 |
| 5,813,652 A * | 9/1998 | Richmond et al. | .......... | 251/30.03 |
| 6,959,904 B2 * | 11/2005 | Beraldo | ..................... | 251/30.03 |
| 7,143,992 B2 * | 12/2006 | Sassone et al. | ............. | 251/30.03 |
| 8,113,225 B2 * | 2/2012 | Funari | ....................... | 137/624.11 |
| 2007/0169824 A1* | 7/2007 | Ro et al. | ....................... | 137/614.2 |

* cited by examiner

*Primary Examiner* — Craig Schneider
*Assistant Examiner* — Craig J Price
(74) *Attorney, Agent, or Firm* — Dykema Gossett PLLC

(57) ABSTRACT

An electromagnetic valve having a flow control function. A valve body has an inlet, an outlet, a valve chest, and a valve plate contained inside the valve chest. The valve plate opens and closes a valve seat using a movable core in order to control the flow rate of water and to prevent backflow. A first channel is disposed inside the outlet. A flow control means, configured as a single unit, is inserted into the outlet, and includes a mover for opening and closing a flow of water by being detached from and brought into contact with the first channel, a stator disposed coaxially with the mover. The stator allows the mover to be elastic and freely movable using a restoring element. A flow rate control element is supported on the stator, and has a predetermined interval from the stator to form a second channel.

5 Claims, 5 Drawing Sheets

SOLENOID VALVE HAVING FLOW CONTROL FUNCTION

CROSS REFERENCE TO RELATED APPLICATION

The present application claims priority from Korean Patent Application Number 10-2011-97285 filed on Sep. 27, 2011, the entire contents of which application are incorporated herein for all purposes by this reference.

BACKGROUND OF THE INVENTION

1. Field of the Invention

The present invention relates to an electromagnetic valve that controls the supply of water and, more particularly, to an electromagnetic valve having a flow control function to control the flow rate of water and to prevent backflow.

2. Description of Related Art

Electromagnetic valves, which control the supply of water, are disposed at suitable points along a water supply pipeline that is directly connected to a water supply pipe or the like. Such an electromagnetic valve has an inlet in one portion of a body thereof, through which water supplied from the water supply pipe flows in, and an outlet in another portion of the body, through which the water flows out to a part that uses the water. A valve chest, which contains therein a valve plate, is provided in the portion of the body that is between the inlet and the outlet. The valve plate is switched between opened and closed states using a movable core, which is actuated by a magnetic force from an electromagnet, to open and close a valve seat, thereby controlling the supply of water.

Such an electromagnetic valve is required to control the flow of water, i.e. to control the flow of water so that the flow rate of water remains normal and so that water does not flow back, under the situation in which the pressure at which water is fed is irregular. The flow rate of water must be controlled, for example, when instantaneous counterpressure occurs as a counter reaction after water in the user side has stopped flowing. Otherwise, water in the user side may flow back into the valve. It is also required to control the flow rate of water in response to changes in the pressure of feed water that occurs in a raw water pipe.

Therefore, in recent days, electromagnetic valves are additionally provided in the outlet side thereof with flow control structures, which serve to prevent backflow and control the flow rate of water. Such a flow control structure elastically responds to the outflow of water. Specifically, when the supply of water is stopped, or when water in the user side has stopped flowing, the flow control structure closes a passage between a chamber and the outlet, thereby preventing the water from flowing back in. In addition, the flow control structure may be flexibly disposed in one of the inlet and the outlet, in an orientation that is perpendicular to the route of flowing water, such that it can change the area of its channel in response to changes in the pressure with which water is supplied, thereby keeping the flow of water at a regular rate.

However, such flow control requires separate structures for preventing backflow and controlling the flow rate. That is, the structure for preventing backflow and the structure for controlling the flow rate are independently fabricated. The structure for preventing backflow is disposed on the outlet side, and the structure for controlling the flow rate is separately disposed on either the inlet or outlet side.

As the flow control structures are separately disposed as above, subsidiary components are additionally provided for the installation of these structures, thereby making the structures and channels complicated. In addition, larger space is needlessly occupied, resistance to the flow of water increases, the control of the flow rate becomes unstable, and the assembly of complicated structures results in defects, thereby lowering the reliability of the product.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an electromagnetic valve having a flow control function, in which a structure for preventing backflow and a flow control structure that controls the flow rate of water in response to changes in the pressure of water are coaxially assembled into a single unit in order to simplify the structure of the valve and to provide stable control over the flow of water, thereby supplying water at a regular flow rate and improving reliability.

Also provided is an electromagnetic valve having a flow control function, in which a control structure, which is implemented as a single unit, is contained in the outlet side of the valve via simple insertion, so that the valve can be simply assembled, thereby improving workability, preventing defects, and improving assemblability.

In an aspect of the present invention, the electromagnetic valve having a flow control function includes a valve body. The valve body has an inlet through which water flows in, an outlet through which the water flows out, a valve chest in a central portion of the body, and a valve plate contained inside the valve chest. The valve plate opens and closes a valve seat depending on opened and closed states using a movable core, which is actuated by magnetic force from an electromagnet, in order to control the flow rate of water and to prevent backflow. The electromagnetic valve also includes a first channel for water, disposed inside the outlet, and a flow control means inserted into the outlet. The flow control means is configured as a single unit. The flow control means includes a mover for opening and closing a flow of water by being detached from and brought into contact with the first channel, a stator disposed coaxially with the mover, the stator allowing the mover to be elastic and freely movable using a restoring element, and a flow rate control element supported on the stator, the flow rate control element having a predetermined interval from the stator to form a second channel. The electromagnetic valve realizes improvement in assemblability due to a relatively simple structure, and provides stable control over the flow of water.

According to embodiments of the present invention, in the electromagnetic valve having a flow control function, the structure for preventing backflow and the flow control structure that controls the flow rate of water in response to changes in the pressure of water are coaxially assembled into a single unit in order to simplify the structure of components and to provide stable control over the flow of water, thereby, supplying water at a regular flow rate and improving reliability.

In addition, the control structure, which is implemented as a single unit, is contained in the outlet side of the valve via simple insertion, so that the product can be simply assembled, thereby improving workability, preventing defects, and improving assemblability.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention, examples of which are illustrated in the accompanying drawings and described below. While the invention will be described in conjunction with exemplary embodiments thereof, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Figure 1:
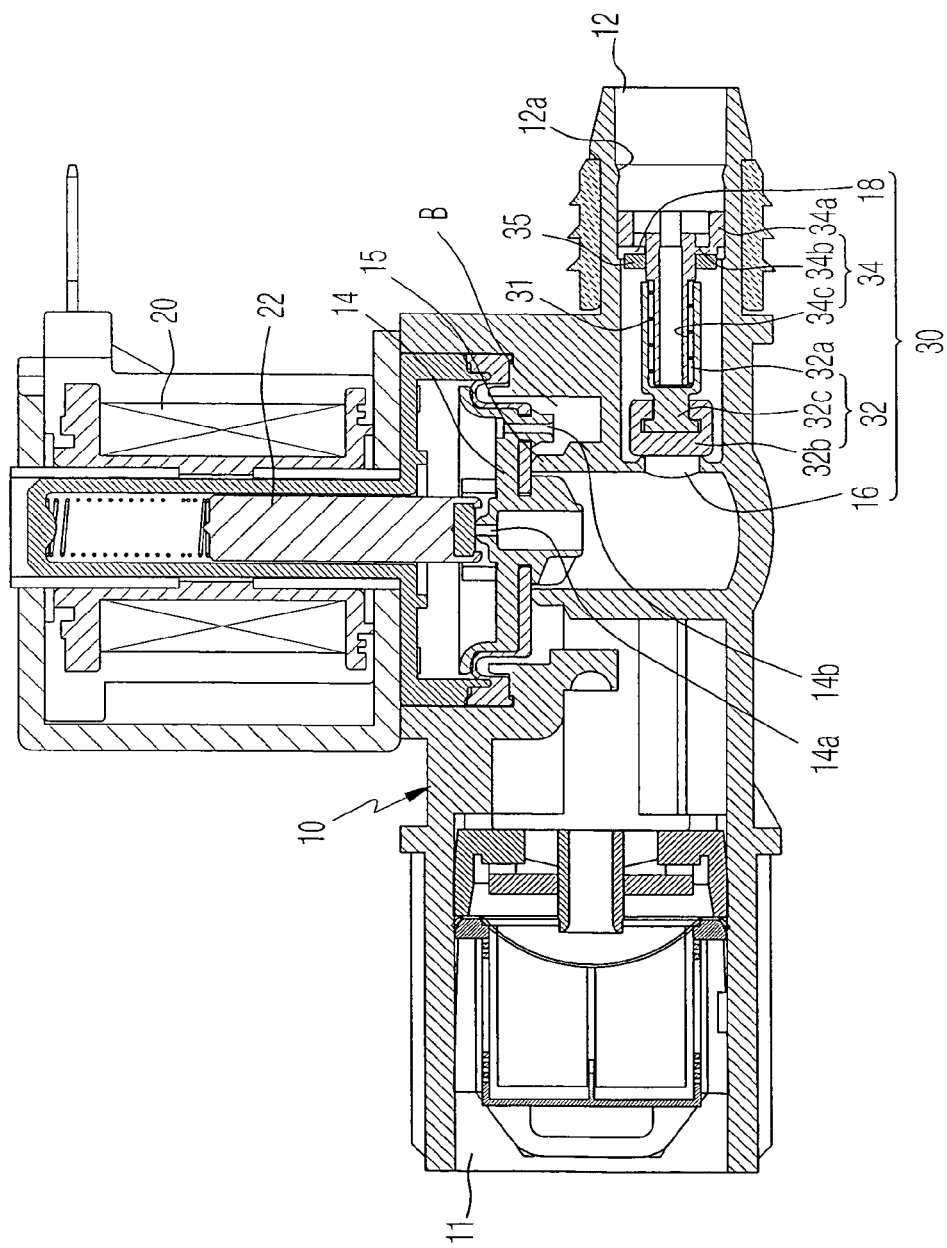
FIG. 1 is a cross-sectional view schematically showing the entire structure of an electromagnetic valve having a flow control function according to an embodiment of the present invention.
Figure 2:
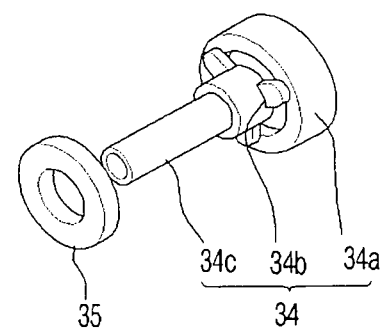
FIG. 2 is an exploded perspective view of the stator of the flow control means, which is employed in the electromagnetic valve having a flow control function shown in FIG. 1.

A description is given below of an embodiment of the present invention with reference to FIG. 1 and FIG. 2, which specifically show an electromagnetic valve having flow control function according to an embodiment of the present invention.

The electromagnetic valve of this embodiment generally includes a body 10 and an electromagnet 20. First, the body 10 has defined, in respective sides thereof, an inlet 11 through which water flows in and an outlet 12 through which the water flows out. In the central portion of the body 10, a valve chest 13 is provided such that it communicates with the inlet 11 and the outlet 12. The valve chest 13 has therein a valve seat 15, which is opened and closed by a valve plate 14, which is implemented as a diaphragm.

The valve plate 14 has a first water passage 14a in the central portion thereof and a second water passage 14b in a peripheral portion thereof. The valve plate 14 is pressed such that it is brought into contact with the valve seat 15 by the pressure of water that flows into the upper portion through the second water passage 14b. The first water passage 14a is opened or closed by a movable core 22, which is actuated by magnetic force from the electromagnet 20.

The foregoing construction is the same as of the related art, but the key concept of the present invention is the improvement of the flow control structure that is intended to control the flow rate of water and to prevent water from flowing back in the inlet 12 of the body 10.

In this embodiment, a first channel 16 is formed through a wall, which extends perpendicular to the direction in which water flows, inside the inlet 12 of the body 10. The first channel 16 is a structure that prevents the water from flowing back using a flow control means 30, which will be described below.

The flow control means 30, which provides a single unit as a key factor of the present invention, is fitted between the first channel 16 and the outlet 12.

The flow control means 30 includes a mover 32 and a stator 34, which are assembled together substantially coaxially using a restoring element 31, in a mating fashion such that they are flexible and freely movable.

First, the stator 34 has a tubular base element 34a, which is fixedly fitted into the outlet 12, caught by a fitting protrusion 12a, which is formed on the inner wall of the outlet 12. A tubular guide rod 34c is connected to the base element 34a via a tripod 34b. The guide rod 34c provides a route through which water is supplied as well as a passage through which counterpressure is transmitted to the mover 32, which will be described later, in the operation of closing the first channel 16.

The stator 34 also has an annular flow rate control element 35, which is disposed on the inner side of the base element 34a. The tripod 34b has a predetermined thickness and supports the inner face of the flow rate control element 35 such that the flow rate control element 35 is spaced apart from the base element 34a at a predetermined interval, thereby defining a second channel 18. Here, the flow rate control element 35 is made of a rubber material that has a predetermined amount of flexibility that withstands the pressure with which water is supplied if the pressure is within a normal range but deforms if the pressure is beyond the range, such that the flow rate control element 35 can deform in response to changes in the pressure of water, thereby adjusting the area of the second channel 18.

The mover 32 includes a tubular receptacle element 32a, into which the guide rod 34c of the stator 34 is received, and a head element 32c on the leading end of the receptacle element 32a. A sealing element 32b, which keeps the first channel 16 in the closed state, is provided on the head element 32c.

A description will be given below of the process of operating the electromagnetic valve having a flow control function of this embodiment with reference to FIG. 3 to FIG. 5.

Figure 3:
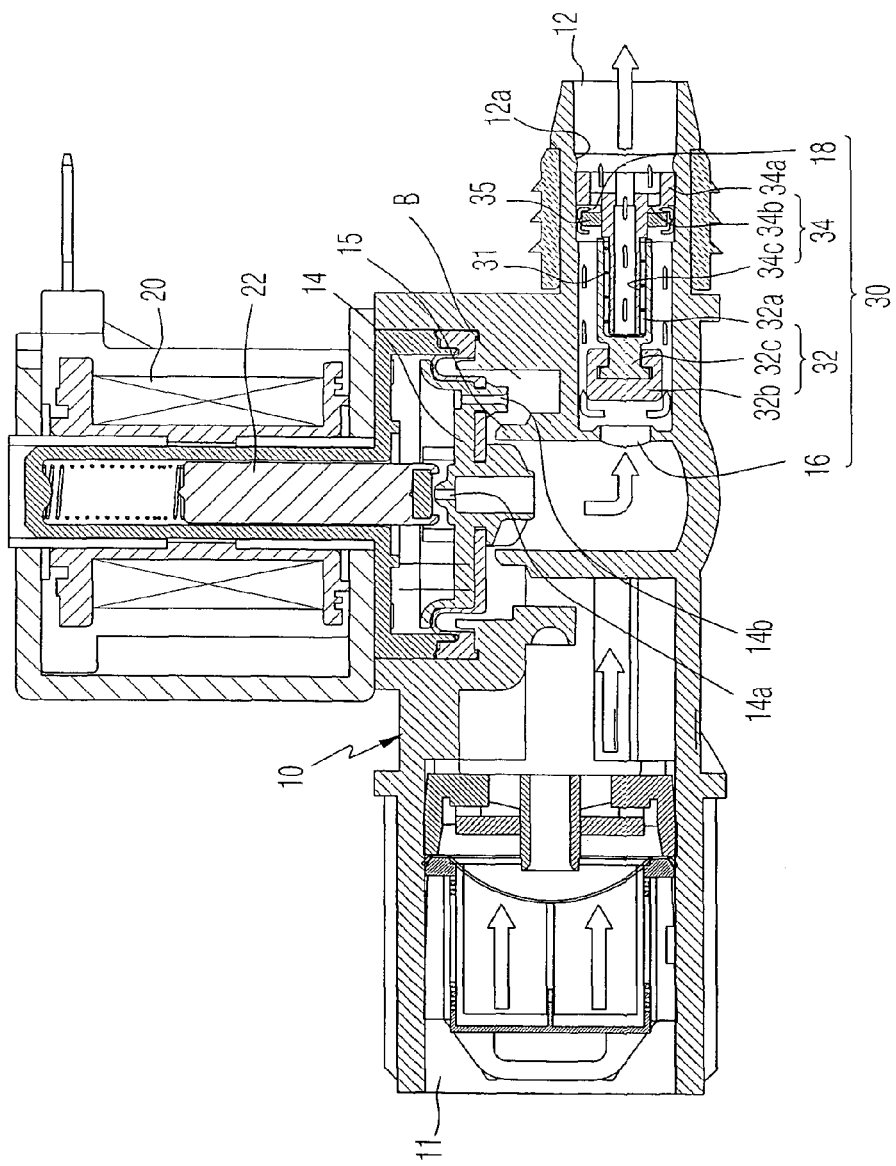
FIG. 3 is a cross-sectional view of the electromagnetic valve having a flow control function shown in FIG. 1, which explains the process in which water is normally supplied.

First, FIG. 3 is an explanatory view showing the process of supplying water. When a water supply signal is applied in a standby state, as shown in FIG. 1, in which the supply of water is shut off, the electromagnet 20 is energized and the movable core 22 is then actuated to open the first water passage 14a, thereby releasing pressure that acts on the valve plate 14 in response to the pressure with which water is supplied. At the same time, the valve plate 14 is dislodged from the valve seat 15 by the pressure with which water is supplied, and the first channel 16 is sequentially opened as the mover 32, which has been keeping the first channel 16 closed, is removed by the pressure with which water is supplied. As a result, water is supplied normally, as indicated by the arrows.

Figure 4:
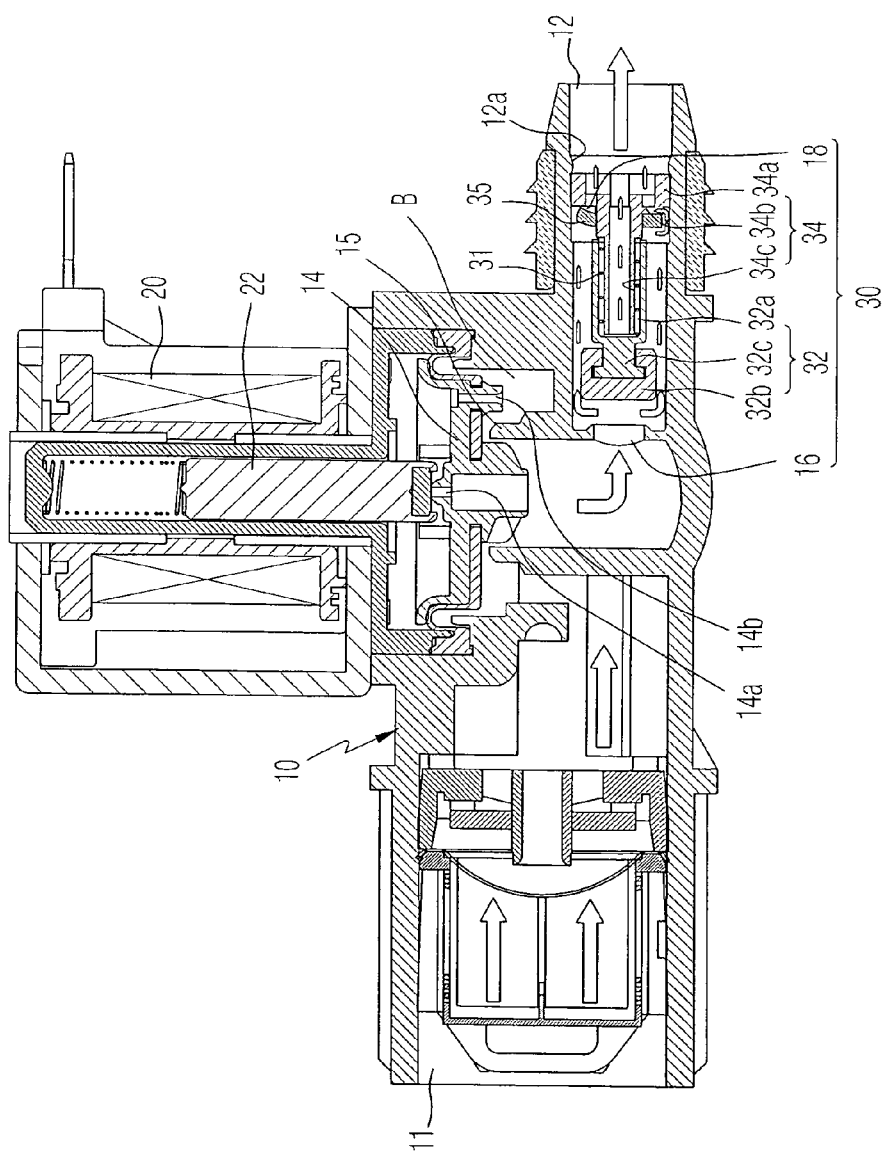
FIG. 4 is a cross-sectional view of the electromagnetic valve having a flow control function shown in FIG. 1, which explains the state in which the cross section of the second channel is decreased when the flow rate control element is deformed in response to changes in the pressure of water.

FIG. 4 is an explanatory view showing the process in which the flow rate is controlled when the pressure with which water is supplied increases to a predetermined value or more. As shown in the figure, the area of the second channel 18 is controlled using the flow rate control element 35, which is pushed towards the base element 34a by the pressure with which water is supplied, so that the water is supplied at a regular flow rate irrespective of a change in the pressure with which water is supplied.

Figure 5:
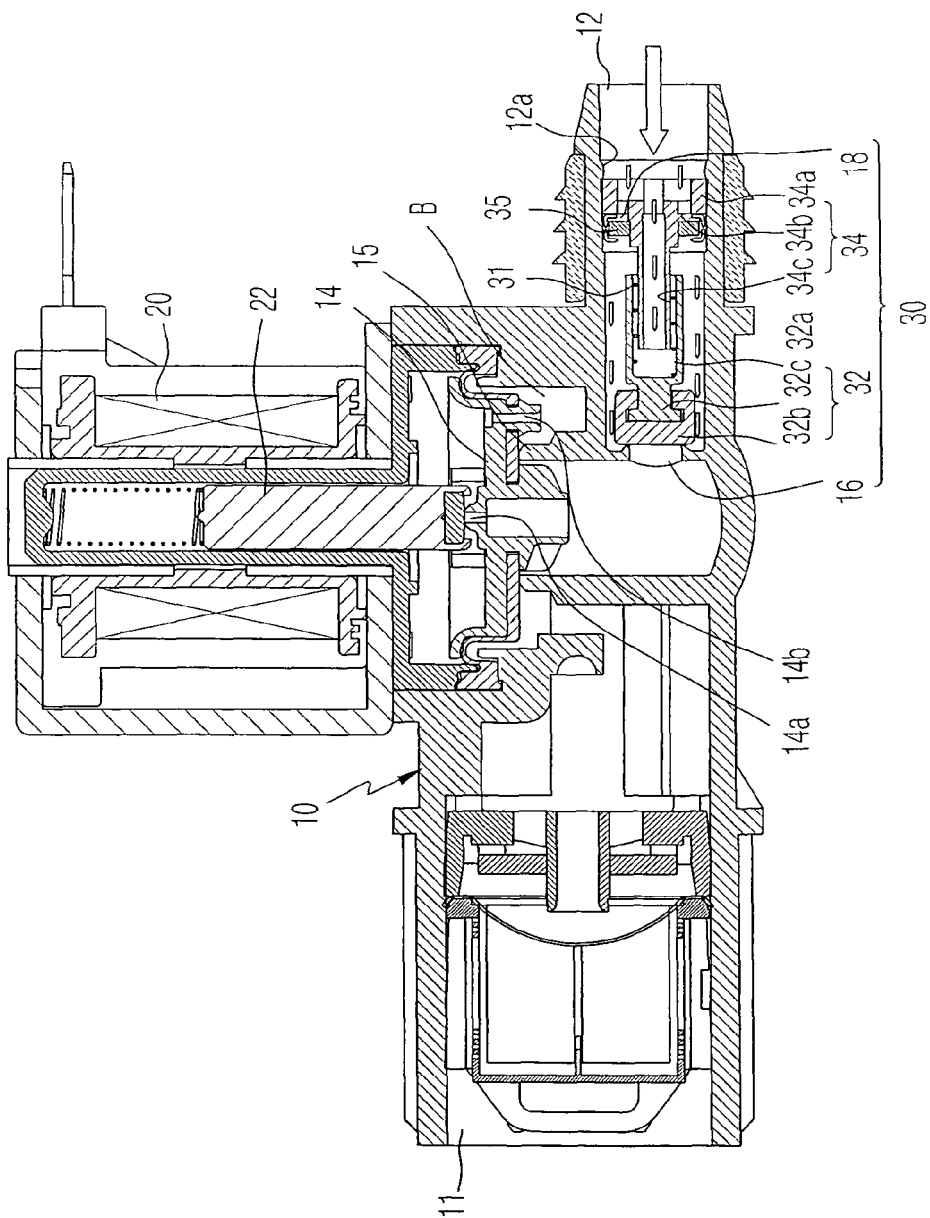
FIG. 5 is a cross-sectional view of the electromagnetic valve having a flow control function shown in FIG. 1, which explains the state in which the mover of the flow control means closes the first channel to prevent backflow when the water in the user side has stopped flowing.

FIG. 5 is an explanatory view showing the process in which the mover 32 of the flow control means 30 automatically closes the first channel 16 in order to prevent backflow when the supply of water is stopped, or when water in the user side has stopped flowing. When the pressure with which water is supplied inside the valve is released or when water in the user side has stopped flowing, the mover 32 of the flow control means 30, which is in the open state, will close the first channel 16 in order to prevent backflow in response to restoring force from the restoring element 31 and counterpressure applied through the guide rod 34c, as indicated by the arrows in the figure. Here, as described above, a total of the restoration force of the restoring element 31 and the counterpressure is transmitted to the mover 32, so that the first channel 16 can more stably and securely stay in the closed state.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromagnetic valve having a flow control function, comprising:
    a valve body, wherein the valve body comprises:
    an inlet through which water flows in;
    an outlet through which the water flows out;
    a valve chest in a central portion of the body; and
    a valve plate contained inside the valve chest, the valve plate opening and closing a valve seat depending on opened and closed states using a movable core, which is actuated by magnetic force from an electromagnet, in order to control a flow rate of water and to prevent backflow,
    a first channel for water, disposed inside the outlet; and
    a flow control means inserted into the outlet, wherein the flow control means is configured as a single unit, and comprises:
    a mover for opening and closing a flow of water by being detached from and brought into contact with the first channel;
    a stator disposed coaxially with the mover, the stator allowing the mover to be elastic and freely movable using a restoring element; and
    a flow rate control element supported on the stator, the flow rate control element having a predetermined interval from the stator to form a second channel,
    wherein, when supply of water, in which the mover of the flow control means keeps the first channel in an opened state in response to pressure with which water is supplied, is stopped, the restoring element causes the mover to automatically restore an original position thereof so that the first channel stays in a closed state, and the flow rate control element is deformed in response to changes in the pressure with which water is supplied, thereby varying the area of the second channel.

2. The electromagnetic valve of claim 1, wherein the stator of the flow control means comprises:
    a tubular base element, which is inserted into the outlet and fixed to the outlet by a protrusion; and
    a tubular guide rod, which is connected to the base element via a tripod.

3. The electromagnetic valve of claim 2, wherein the mover of the flow control means includes:
    a receptacle element, into which the guide rod of the stator is received;
    a head element on a leading end of the receptacle element; and
    a sealing element disposed on the head element, the sealing element keeping the first channel in a closed state.

4. The electromagnetic valve of claim 2, wherein the flow rate control element has an annular shape, and is supported on the guide rod of the stator via the tripod, such that the flow rate control element deforms in response to changes in pressure of water, thereby varying the area of the second channel.

5. The electromagnetic valve of claim 2, wherein the mover of the flow control means is closed based on a total of restoring force of the restoring element and counterpressure that is applied via the guide rod.

\* \* \* \* \*